(12) United States Patent
Resch

(10) Patent No.: US 12,528,496 B2
(45) Date of Patent: Jan. 20, 2026

(54) METHOD FOR ASSISTING A USER OF A VEHICLE DURING AUTOMATED LATERAL GUIDANCE OF THE VEHICLE ON A ROAD HAVING MULTIPLE LANES, COMPUTING DEVICE, AND DRIVER ASSISTANCE SYSTEM

(71) Applicant: Bayerische Motoren Werke Aktiengesellschaft, Munich (DE)

(72) Inventor: Christoph Resch, Obernzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 128 days.

(21) Appl. No.: 18/703,741

(22) PCT Filed: Oct. 28, 2022

(86) PCT No.: PCT/EP2022/080281
§ 371 (c)(1),
(2) Date: Apr. 23, 2024

(87) PCT Pub. No.: WO2023/078806
PCT Pub. Date: May 11, 2023

(65) Prior Publication Data
US 2024/0416942 A1    Dec. 19, 2024

(30) Foreign Application Priority Data

Nov. 5, 2021  (DE) ...................... 10 2021 128 891.6

(51) Int. Cl.
*B60W 50/14* (2020.01)
*B60W 30/12* (2020.01)
(Continued)

(52) U.S. Cl.
CPC ............ *B60W 50/14* (2013.01); *B60W 30/12* (2013.01); *B60W 50/0097* (2013.01);
(Continued)

(58) Field of Classification Search
CPC ........ G16H 20/13; G16H 40/67; G16H 40/63; G16H 10/60; G16H 10/00; G16H 15/00;
(Continued)

(56) References Cited

U.S. PATENT DOCUMENTS

2014/0088862 A1   3/2014  Simon
2018/0088574 A1   3/2018  Latotzki et al.
(Continued)

FOREIGN PATENT DOCUMENTS

DE   10 2010 033 729 A1   2/2012
DE   10 2013 220 487 A1   4/2015
(Continued)

OTHER PUBLICATIONS

International Search Report (PCT/ISA/210) issued in PCT Application No. PCT/EP2022/080281 dated Feb. 20, 2023 with English translation (5 pages).
(Continued)

*Primary Examiner* — Daniel Previl
(74) *Attorney, Agent, or Firm* — Crowell & Moring LLP

(57) ABSTRACT

A method for assisting a user of a vehicle during automated lateral guidance of the vehicle on a road having multiple lanes is provided. The method includes receiving satellite-based position data describing a position of the vehicle; determining map-based lane tracking data describing a future desired movement of the vehicle relative to the lanes based on the satellite-based position data and high-resolution map data; receiving sensor data from at least one environment sensor of the vehicle, the sensor data describing boundaries of the lanes; determining sensor-based lane tracking data describing a future desired movement of the vehicle relative to the lanes based on the sensor data; comparing the map-based lane tracking data and the sensor-based lane tracking data; and controlling an output device
(Continued)

for outputting a takeover request to the user based on a result of the comparison.

11 Claims, 4 Drawing Sheets

(51) Int. Cl.
*B60W 50/00* (2006.01)
*B60W 60/00* (2020.01)
*G06V 20/56* (2022.01)

(52) U.S. Cl.
CPC .... *B60W 60/0053* (2020.02); *B60W 60/0057* (2020.02); *G06V 20/588* (2022.01); *B60W 2420/403* (2013.01); *B60W 2552/53* (2020.02); *B60W 2556/40* (2020.02); *B60W 2556/50* (2020.02)

(58) Field of Classification Search
CPC ........ G16H 20/00; G16H 30/00; G16H 40/00; G16H 50/00; G16H 70/00; G16H 80/00; A61J 7/0084; A61J 7/0481; A61J 2200/30; A61J 7/0454; A61J 7/049; A61J 7/0418; A61J 7/0445; A61J 7/0436; A61J 2200/70; A61J 7/0427; A61J 2205/70; A61J 7/0069; A61J 1/03; A61J 2205/30; A61J 7/04; A61J 1/035; A61J 1/1412; A61J 1/1437; A61J 2205/10; A61J 2205/60; A61J 7/0463; A61J 1/00; A61J 3/00; A61J 7/00; A61J 9/00; A61J 11/00; A61J 13/00; A61J 15/00; A61J 17/00; A61J 19/00; A61J 2200/00; A61J 2205/00; A61B 2505/07; A61B 2560/0242; A61B 2562/226; A61B 5/0022; A61B 5/02055; A61B 5/021; A61B 5/024; A61B 5/0816; A61B 5/1112; A61B 5/1117; A61B 5/411; A61B 5/4839; A61B 5/6805; A61B 1/00; A61B 3/00; A61B 5/00; A61B 6/00; A61B 7/00; A61B 8/00; A61B 9/00; A61B 10/00; A61B 13/00; A61B 16/00; A61B 17/00; A61B 18/00; A61B 34/00; A61B 42/00; A61B 46/00; A61B 50/00; A61B 90/00; A61B 2217/00; A61B 2218/00; A61B 2503/00; A61B 2505/00; A61B 2560/00; A61B 2562/00; A61B 2576/00; G07F 17/0092; G07F 11/70; G07F 9/002; B25J 15/0052; B25J 9/0096; B65B 2220/14; B65B 2230/02; B65B 35/08; B65B 43/44; B65B 43/46; B65B 43/50; B65B 5/103; B65D 1/0246; B65D 1/04; B65D 2215/02; B65D 2215/04; B65D 2251/0015; B65D 2251/0087; B65D 2575/3245; B65D 2575/3281; B65D 47/0847; B65D 5/46024; B65D 5/46112; B65D 50/04; B65D 50/06; B65D 51/18; B65D 75/327; B65D 83/0463; G06F 21/35; G06F 2221/2111; G06K 19/07762; G07C 9/28
USPC ....... 340/438, 439, 464, 488, 511, 516, 525, 340/538.14, 539.22, 539.13, 568.1, 571, 340/636.11, 661, 691.6
See application file for complete search history.

(56) References Cited

U.S. PATENT DOCUMENTS

| | | | |
|---|---|---|---|
| 2019/0278278 A1* | 9/2019 | Yasuda | G05D 1/0214 |
| 2019/0286129 A1* | 9/2019 | Yasuda | G05D 1/0061 |
| 2020/0074851 A1* | 3/2020 | Mukai | G08G 1/0125 |
| 2020/0283029 A1* | 9/2020 | Mimura | B60W 60/00253 |
| 2020/0285245 A1* | 9/2020 | Noguchi | G08G 1/149 |

FOREIGN PATENT DOCUMENTS

| | | |
|---|---|---|
| DE | 10 2014 216 018 A1 | 2/2016 |
| DE | 10 2019 215 263 A1 | 4/2021 |
| DE | 10 2020 206 830 A1 | 12/2021 |

OTHER PUBLICATIONS

German-language Written Opinion (PCT/ISA/237) issued in PCT Application No. PCT/EP2022/080281 dated Feb. 20, 2023 with English translation (9 pages).
German-language Search Report issued in German Application No. 10 2021 128 891.6 dated May 16, 2022 with partial English translation (11 pages).

* cited by examiner

METHOD FOR ASSISTING A USER OF A VEHICLE DURING AUTOMATED LATERAL GUIDANCE OF THE VEHICLE ON A ROAD HAVING MULTIPLE LANES, COMPUTING DEVICE, AND DRIVER ASSISTANCE SYSTEM

BACKGROUND AND SUMMARY

The present invention relates to a method for assisting a user of a vehicle during automated lateral guidance of the vehicle on a road having multiple lanes. In addition, the present invention relates to a computing device for a driver assistance system of a vehicle. Further, the present invention relates to a driver assistance system having such a computing device. Finally, the present invention relates to a computer program.

Driver assistance systems that assist the user, or driver, of a vehicle in lateral guidance of the vehicle are known from the prior art. Such a driver assistance system, which can also be referred to as a lateral guidance system, can help to guide the vehicle within a lane and therefore to relieve the user of the burden of steering work. Such driver assistance systems can permit the user to briefly take their hands from the steering wheel. Such systems are also referred to as hands-on systems.

Lateral guidance systems today are based, for example, on sensor data from a surroundings sensor, in particular a camera, that describe the road markings of a lane. These sensor data can be affected by external environmental conditions, however. Variables derived from these sensor data, for example, lane curvature and/or lane progression, are susceptible to environmental influences, for example, the low-lying sun or heavy rain. In the worst case, this can lead to the vehicle straying from the lane, today's lateral guidance systems being designed as hands-on systems and therefore being deemed safe despite this disadvantage.

Furthermore, it is known from the prior art that, in addition to the sensor data from the camera, or front camera, sensor data from other surroundings sensors can also be used. For example, the sensor data from a radar sensor can be taken into consideration in an appropriate fusion concept.

For future lateral guidance systems permitting constant hands-off operation for the user, the quality of the lane information from the sensor data from at least one surroundings sensor is no longer adequate. The desired hands-off operation results in lower controllability for the user, meaning that the demands on lane information detection increase. For this reason, it is necessary for lane information detection to be improved and/or monitored on the basis of the sensor data from the surroundings sensors, in particular detection of lane curvature and/or lane progression.

Furthermore, it is known from the prior art that the position of a vehicle can be determined on the basis of the data from a satellite-based position determination system and a high-resolution map. For example, this allows the position of the vehicle to be determined to the exact lane, or with reference to one lane of a road. Even this map-based position determination can result in applicable variances and errors arising during the operation of a lateral guidance system.

It is an object of the present invention to demonstrate a solution to how a user of a vehicle can be assisted more reliably and more safely during automated lateral guidance of the vehicle.

This object is achieved according to the invention by a method, by a computing device, by a driver assistance system and by a computer program having the features according to the independent claims. Advantageous developments of the present invention are specified in the dependent claims.

A method according to the invention is used to assist a user of a vehicle during automated lateral guidance of the vehicle on a road having multiple lanes. The method comprises receiving satellite-based position data that describe a current position of the vehicle. In addition, the method comprises determining map-based lane progression data that describe a future desired position and/or future desired movement of the vehicle with reference to the lanes on the basis of the satellite-based position data and high-resolution map data. Further, the method comprises receiving sensor data from at least one surroundings sensor of the vehicle, the sensor data describing boundaries, in particular road markings, of the lanes. In addition, the method comprises determining sensor-based lane progression data that describe a future desired position and/or future desired movement of the vehicle with reference to the lanes on the basis of the sensor data. Additionally, the method comprises comparing the map-based lane progression data and the sensor-based lane progression data and triggering an output device to output a takeover request to the user on the basis of a result of the comparison.

The method is intended to be used to detect a discrepancy between the lane progression from the sensor data and the lane progression from the high-resolution map during automated lateral guidance of the vehicle. In addition, the user is intended to be made aware of a possible error in the lateral guidance, and asked to take over, early on.

During this automated lateral guidance of the vehicle, a driver assistance system of the vehicle, which can also be referred to as a lateral guidance system, can be used to undertake applicable steering interventions so that the vehicle is maneuvered within the lane of the road. For example, the vehicle can be maneuvered by means of the driver assistance system in such a way that it is maneuvered centrally between the road markings of a lane. The road is a road having at least two or more lanes that are separated from one another. The road may be a downtown road, a national road, a freeway-like road, a freeway or the like. Preferably, there is moreover provision for the driver assistance system of the vehicle to also be used to take over automated longitudinal guidance of the vehicle.

The method can be carried out using an appropriate computing device of the vehicle or of the driver assistance system. This computing device may comprise at least one electronic control unit. This computing device can be used to receive the satellite-based position data received, for example, using a receiver for a satellite-based position determination system. The receiver can be used to receive applicable position data from a global navigation satellite system (GNSS). In particular, a so-called differential global positioning system is used that can improve the accuracy of position determination or GNSS navigation by transmitting correction data.

In addition, high-resolution map data, or highly accurate map data, or so-called HD maps, are used in order to be able to determine the current position of the vehicle. These high-resolution map data can be received by the computing device. The high-resolution map data may be stored in a memory of the driver assistance system and/or can be received from an external computing device. The satellite-based position data and the high-resolution map data can then be taken as a basis for determining the map-based lane progression data. The position data and/or the lane progression data can be determined with reference to a world coordinate system. These map-based lane progression data describe the future desired movement of the vehicle with reference to one lane from the multiple lanes of the road. The map-based lane progression data can be determined on the basis of the individual position data. This allows the position of the vehicle to be ascertained to the exact lane, and this can then be used to ascertain the lane progression to the exact lane. The term "to the exact lane" is intended in the present instance to be understood to mean that, when there are multiple lanes, it is ascertained which of the multiple lanes the vehicle is currently in.

In addition, the computing device is used to receive the sensor data. These sensor data originate from at least one surroundings sensor of the vehicle, or of the driver assistance system. The surroundings sensor may be in particular a camera, or a front camera, of the driver assistance system. These sensor data provided using the surroundings sensor, or the camera, describe the boundary, or boundaries, of at least one of the lanes. The boundaries may be in particular road markings. The respective road markings are used to delimit the respective lanes. The boundary of a lane may also be a structural boundary. The boundary of the lane may also be turf or the like.

These sensor data are then taken as a basis for determining the sensor-based lane progression data that describe the future desired movement of the vehicle with reference to the lanes on the basis of the sensor data. This means in particular that the detected boundaries, or road markings, can be used to determine the current position of the vehicle with reference to these boundaries, or road markings. The sensor data can be taken as a basis for determining the position of the vehicle within the lane. This can then be used to infer the future desired movement of the vehicle.

There may further be provision for the data from other surroundings sensors, for example, radar sensors, lidar sensors or the like, to be used and to be fused with the sensor data from the camera, in order to ascertain the sensor-based lane progression data. The sensor data from the other surroundings sensors can also describe other road users in the lanes.

According to the present invention, there is now provision for the map-based lane progression data and the sensor-based lane progression data to be compared with one another. Both the map-based lane progression data and the sensor-based lane progression data can describe the current and/or future position of the vehicle. The future movement of the vehicle can also be determined by taking into consideration the current steering angle of the vehicle and/or scheduled steering interventions. The lane progression data can describe a trajectory and/or a driving path.

A difference, or variance, can be ascertained between the map-based lane progression data and the sensor-based lane progression data. In other words, this means in particular that the lane information determined on the basis of the sensor data from the front camera and the lane information ascertained on the basis of the high-accuracy map are compared with one another. If the map-based lane progression data and the sensor-based lane progression data differ from one another too greatly, for example, the computing device can be used to trigger an output device of the driver assistance system.

The output device can be triggered in such a way that a takeover request is output to the user, or driver. This takeover request involves the driver being asked to manually take over the helm of the vehicle again. Moreover, the driver can be asked to take their hands back to the steering wheel.

During automated lateral guidance of the vehicle, there is in particular provision for the driver to be able to take their hands from the steering wheel. This provides a so-called hands-off function. The takeover request can be used to deactivate this hands-off function again.

If the map-based lane progression data and the sensor-based lane progression data are at variance with one another, there is a very high probability of being able to assume that either the map-based lane progression data or the sensor-based lane progression data are erroneous. In such a situation, there may be the threat of the lane of the vehicle being left during automated lateral guidance if the lateral guidance is carried out on the basis of the erroneous data. To guarantee safety in road traffic, a distinction between the map-based lane progression data and the sensor-based lane progression data results in handover to the user in good time. This allows the driver to be safely and reliably assisted in operating the driver assistance system for automated lateral guidance.

Preferably, the output device is triggered to output the takeover request if a difference between the map-based lane progression data and the sensor-based lane progression data is above a predetermined threshold value. As already explained, the vehicle can be located within the lane by way of a special algorithm in the high-accuracy map using GNSS. Location to the exact lane allows the lane progression data to be read from the high-accuracy map for the current vehicle position. These map-based lane progression data and the sensor-based lane progression data, which are determined on the basis of the measurements of the at least one surroundings sensor, are then compared with one another. In this instance, in particular the characteristics or curvature characteristics of the map-based lane progression data and the sensor-based lane progression data can be compared with one another. If the difference between the map-based lane progression data and the sensor-based lane progression data is above the predetermined threshold value, the takeover request can be output to the user.

Alternatively or additionally, there may be provision for checking whether the difference between the map-based lane progression data and the sensor-based lane progression data is above a predetermined limit value. In this case, the output device can be triggered to output the takeover request if the difference between the map-based lane progression data and the sensor-based lane progression data is above the limit value a predetermined number of times, or repeatedly.

In another configuration, the map-based lane progression data and/or the sensor-based lane progression data are taken as a basis for determining route planning for future automated lateral guidance of the vehicle if the difference between the map-based lane progression data and the sensor-based lane progression data is below the predetermined threshold value. If the map-based lane progression data and the sensor-based lane progression data are sufficiently concordant, they can be used as a basis for the automated lateral guidance of the vehicle, or the future lateral guidance of the vehicle. The lateral guidance can be carried out on the basis of the map-based lane progression data or the sensor-based lane progression data alone, in principle. The particular other lane progression data can then be used for verification or plausibilization. There may also be provision for the route planning to be carried out both on the basis of the map-based data and on the basis of the sensor-based lane progression data. The determined route planning can then be used to undertake the lateral guidance servo-control of the vehicle and therefore to intervene in the steering of the vehicle.

In another configuration, the difference between the map-based lane progression data and the sensor-based lane progression data is determined continually. For example, the difference between the map-based lane progression data and the sensor-based lane progression data can be determined periodically, or within particular time intervals. Alternatively, there may be provision for the difference between the map-based lane progression data and the sensor-based lane progression data to be determined periodically within defined distance intervals covered by the vehicle. In this way, it is possible to ensure that a variance between the map-based lane progression data and the sensor-based lane progression data is detected in good time and therefore the takeover request can be output in good time.

Furthermore, it is advantageous if the takeover request is output in such a way that the vehicle is prevented from leaving the lane until a probable time of takeover by the driver. In other words, the takeover request is intended to be delivered to the user early enough for the user to still have sufficient time to take the steering wheel and for the lane not to be left. In particular, there is provision for the takeover request to be output as soon as the difference between the map-based lane progression data and the sensor-based lane progression data is above the predetermined threshold value. In principle, the current speed, the progression of the lane and the steering angle can be taken as a basis for determining the time at which the lane is left. Moreover, the probable time at which the helm is taken over by the driver can be estimated. This allows the vehicle to be prevented from leaving the lane.

A computing device for a driver assistance system of a vehicle according to the invention is designed to carry out a method according to the invention and the advantageous configurations thereof. The computing device may be formed by at least one electronic control unit of a vehicle. In principle, the computing device can have at least one processor and/or a storage element.

A driver assistance system for a vehicle according to the invention comprises a computing device according to the invention. In addition, the driver assistance system comprises an output device for outputting a takeover request to a user of the vehicle. This output device may be designed to output the takeover request to the user visually, audibly and/or haptically. In addition, the driver assistance system is designed to carry out automated lateral guidance of the vehicle.

The driver assistance system can have at least one surroundings sensor that can be used to provide the sensor data that describe the road markings. This surroundings sensor may preferably be in the form of a camera, or front camera. In addition, the driver assistance system can have further surroundings sensors, which may be in the form of a radar sensor, lidar sensor or the like, for example. In addition, the driver assistance system can have a receiver for a satellite-based positioning system. Moreover, the driver assistance system can have a memory, or a storage device, that stores a high-resolution map, or a so-called HD map.

A vehicle according to the invention comprises a driver assistance system according to the invention. The vehicle is in particular in the form of an automobile.

Another aspect of the invention relates to a computer program comprising instructions that, when the program is executed by a computing device, cause said computing device to perform a method according to the invention and the advantageous configurations thereof. Moreover, the invention relates to a computer-readable (storage) medium comprising instructions that, when executed by a computing device, cause said computing device to perform a method according to the invention and the advantageous configurations thereof.

The preferred embodiments presented in relation to the method according to the invention, and the advantages of said embodiments, apply accordingly to the computing device according to the invention, to the driver assistance system according to the invention, to the vehicle according to the invention, to the computer program according to the invention and to the computer-readable (storage) medium according to the invention.

Other features of the invention are evident from the claims, the figures and the description of the figures. The features and combinations of features cited in the description hereinabove and the features and combinations of features cited in the description of the figures hereinbelow and/or shown in the figures alone can be used not only in the particular indicated combination but also in other combinations or on their own without departing from the scope of the invention.

The invention will now be explained more thoroughly on the basis of preferred exemplary embodiments and with reference to the accompanying drawings, in which:

DETAILED DESCRIPTION OF THE DRAWINGS

In the figures, identical or functionally identical elements are provided with the same reference signs.

Figure 1:
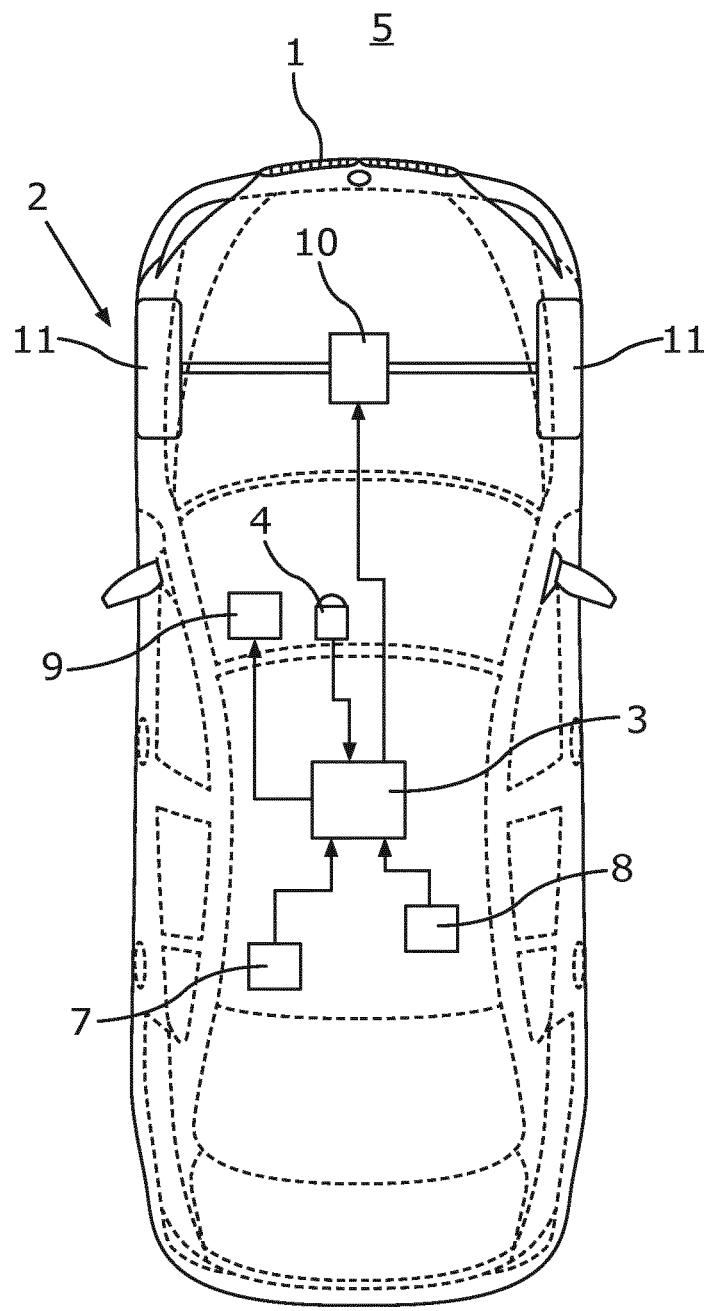
FIG. 1 shows a schematic representation of a vehicle that has a driver assistance system for assisting a user of the vehicle in lateral guidance of the vehicle.

FIG. 1 shows a vehicle 1, which in the present instance is in the form of an automobile, in a plan view. The vehicle 1 comprises a driver assistance system 2 that is used to assist the user, or driver, of the vehicle 1 in lateral guidance of the vehicle 1. In particular, the driver assistance system 2 is used to take over automated lateral guidance of the vehicle 1. In particular, the driver assistance system 2 can take over the lateral guidance in such a way that the driver can permanently take their hands from the steering wheel.

The driver assistance system 2 comprises a computing device 3, which may be formed by at least one electronic control unit of the vehicle 1, for example. In addition, the driver assistance system 2 comprises at least one surroundings sensor 4, which in the present instance is in the form of a camera, or front camera. The surroundings sensor 4 can be used to provide sensor data that describe an environment 5 of the vehicle 1. In particular, the sensor data, or the image data, can describe boundaries of lanes 13 and in particular road markings 6. These sensor data can be transmitted from the surroundings sensor 4, or the camera, to the computing device 3.

Furthermore, the driver assistance system 2 comprises a receiver 7 for a satellite-based position determination system. The receiver 7 can be used to determine position data that describe the current position of the vehicle 1. Furthermore, the driver assistance system 2 comprises a storage device 8 that stores high-resolution map data, or so-called HD maps. Furthermore, the driver assistance system 2 comprises an output device 9 that can be used to output an output to the user of the vehicle 1. This output can be output visually, audibly and/or haptically, in principle.

In addition, the computing device 3 is designed to control a steering system 10 of the vehicle 1, which steering system is depicted only schematically in the present instance. Controlling the steering system 10 makes it possible to take over the lateral guidance of the vehicle 1. In this case, controlling the steering system 10 allows steerable wheels 11 of the vehicle 1 to be moved. Preferably, there is moreover provision for the computing device 3 to be able to be used to also control a drive motor and/or a braking system of the vehicle 1, in order to also take over the longitudinal guidance of the vehicle 1.

Figure 2:
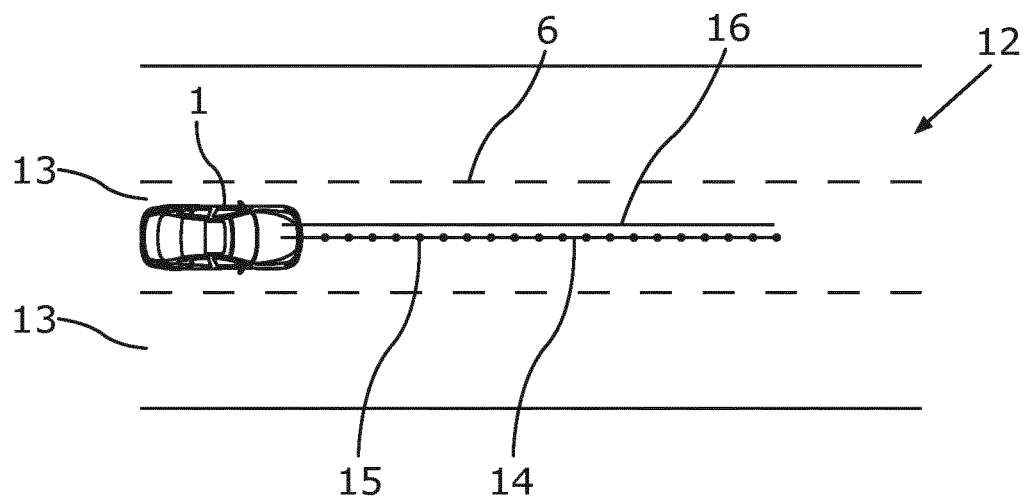
FIG. 2 shows a schematic presentation of a road that comprises a plurality of lanes, and also sensor-based lane progression data and map-based lane progression data.

FIG. 2 shows a schematic representation of the vehicle 1, which is on a multilane road 12. This multilane road 12 comprises multiple lanes 13, which are separated from one another by the road markings 6. In the present instance, the vehicle 1 is in the middle lane 13. In addition, FIG. 2 shows a schematic representation of map-based lane progression data 14. These map-based lane progression data 14 comprise individual points 15 that are determined on the basis of the position data from the receiver 7 for the satellite-based position determination system and the high-resolution map data. The map-based lane progression data 14 can be used to ascertain the position, or the future desired movement, of the vehicle 1 within one of the lanes 13.

Furthermore, FIG. 2 shows a schematic representation of sensor-based lane progression data 16 that likewise describe the position, or the future desired movement, of the vehicle 1 with reference to one of the lanes 13. These sensor-based lane progression data 16 are provided on the basis of the sensor data from the at least one surroundings sensor 4. In the present instance, the map-based lane progression data 14 and the sensor-based lane progression data 16 are each illustrated as a trajectory.

Figure 3:
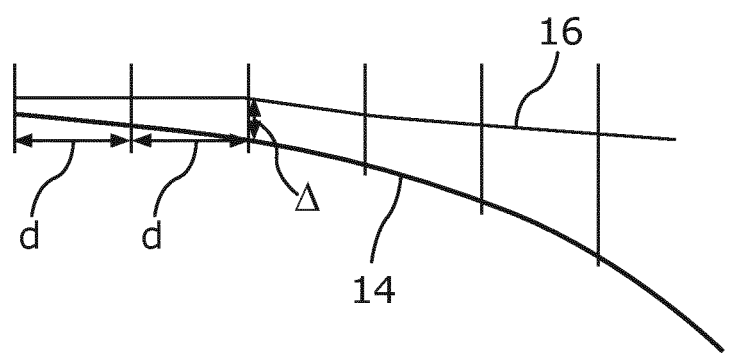
FIG. 3 shows the map-based lane progression data and the sensor-based lane progression data and also variances between the lane progression data.

FIG. 3 shows a schematic representation of the map-based lane progression data 14 and the sensor-based lane progression data 16. In the present instance, there is provision for a difference A between the map-based lane progression data 14 and the sensor-based lane progression data 16 to be determined within predetermined distance intervals d.

Figure 4:
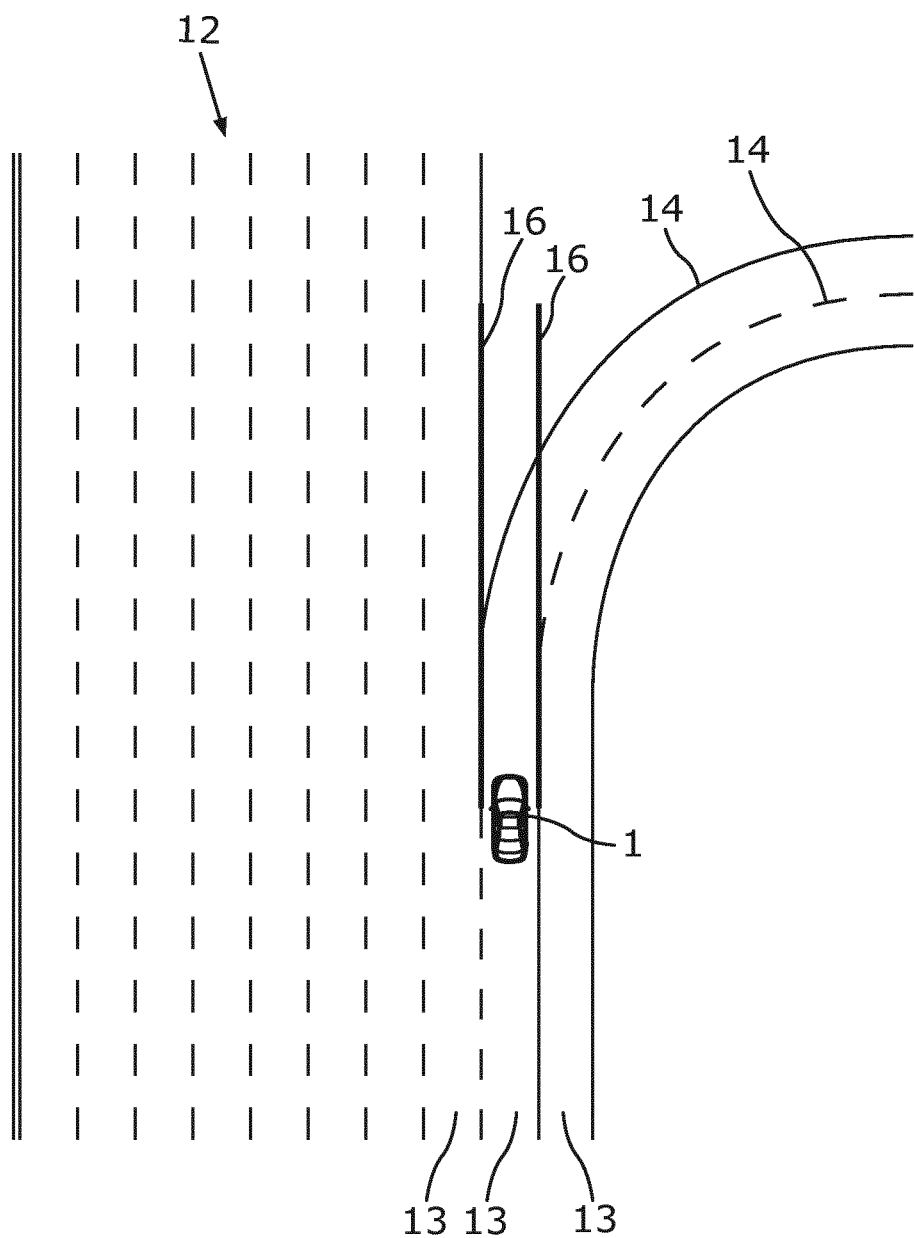
FIG. 4 shows a schematic representation of the vehicle shown in FIG. 1, which is on a multilane road.

FIG. 4 shows a schematic representation of the vehicle 1 on a multilane road 12 according to another embodiment. In this case, the multilane road 12 comprises ten lanes 13. A situation for a typical freeway interchange is depicted in the present instance. The two rightmost lanes 13 branch off to the right. In addition, the map-based lane progression data 14 and the sensor-based lane progression data 16 are depicted. In the present instance, the respective lane progression data 14, 16 describe a future driving path of the vehicle 1, or the predicted subsequent progression of the lanes 13. It is assumed in the present instance that the vehicle 1 is in the second lane 13 from the right and the automated lateral guidance is taken over by the driver assistance system 2. In addition, it is assumed that a hands-off function is provided and the user has therefore permanently taken their hands from the steering wheel of the vehicle 1.

It can be seen in the example of FIG. 4 that the map-based lane progression data 14 and the sensor-based lane progression data 16 are at variance with one another. The difference A between the map-based lane progression data 14 and the sensor-based lane progression data 16—as depicted in FIG. 3—can be determined continually, or periodically. The lane progression data 16 that have been determined on the basis of the sensor data from the camera, or the surroundings sensor 4, show an incorrect lane progression. If the vehicle 1 were to follow this lane progression, the vehicle 1 would stray from the lane 13 within a short time. Depending on the radius of the exit lane, or the lane 13 that the vehicle 1 is currently in, the vehicle would stray from the lane more quickly or more slowly.

The map-based lane progression data 14 show the correct, or true, lane progression, which has been ascertained on the basis of the high-accuracy map data. Since the map-based lane progression data 14 are compared with the sensor-based lane progression data 16 in the present instance and a difference A is detected that is above a predetermined threshold value, the output device 9 is used to output a takeover request to the user. Moreover, the hands-off function is deactivated.

Figure 5:
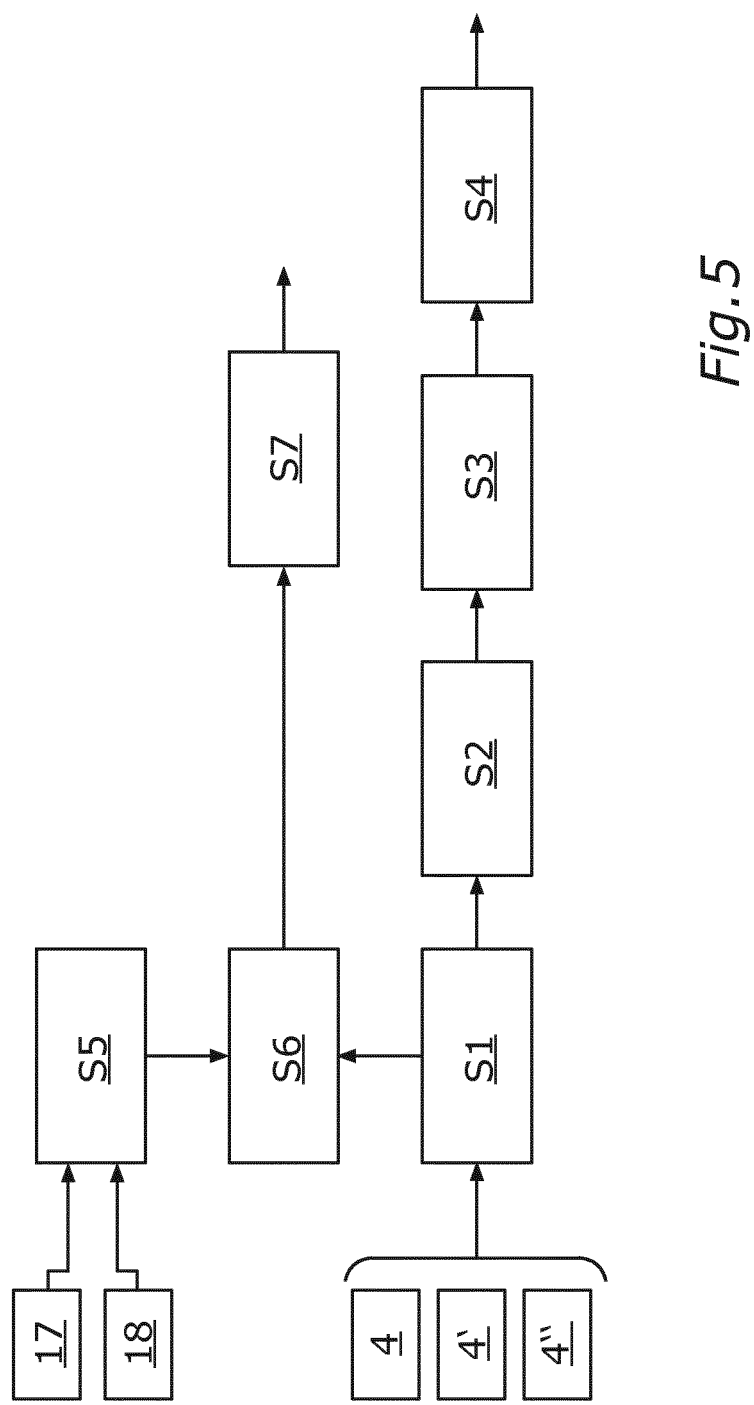
FIG. 5 shows a schematic flowchart for a method for assisting a user in lateral guidance of the vehicle.

FIG. 5 shows a schematic flowchart for a method for assisting the user in lateral guidance of the vehicle 1. The sensor data from the surroundings sensor 4, or the camera, are provided in this instance. Additionally, sensor data from other surroundings sensors 4', 4" can also be provided. The sensor data can also be appropriately fused. In a step S1, the sensor-based lane progression data 16 are then provided. Next, in a step S2, route planning for the vehicle 1 can then be determined. In addition, servo-control can be carried out in a step S3 and, in a step S4, the steering system 10 of the vehicle 1 can then be controlled so that the resulting vehicle movement is obtained.

The high-resolution map data 17 and the satellite-based position data 18 from the satellite-based position determination system can then be taken as a basis for determining the map-based lane progression data 14 in a step S5. Alternatively or additionally, there may also be provision for the route planning, the servo-control and the adjustment of the steering system 10 according to steps S2 to S4 to be carried out on the basis of the map-based lane progression data 14.

In a step S6, the map-based lane progression data 14 are then compared with the sensor-based lane progression data 16. The result of the comparison is then taken as a basis for deciding whether or not the hands-off function is deactivated. In a step S7, a functional or display logic is then provided with regard to the hands-off function. If the difference A between the map-based lane progression data 14 and the sensor-based lane progression data 16 is above a threshold value, the takeover request is output to the user.

What is claimed is:

1. A method for assisting a user of a vehicle during automated lateral guidance of the vehicle on a road having a plurality of lanes, the method comprising:
   receiving satellite-based position data that describe a position of the vehicle;
   determining map-based lane progression data that describe a future desired movement of the vehicle with reference to the plurality of lanes based on the satellite-based position data and high-resolution map data;
   receiving sensor data from at least one surroundings sensor of the vehicle, the sensor data describing boundaries of the plurality of lanes;
   determining sensor-based lane progression data that describe a future desired movement of the vehicle with reference to the plurality of lanes based on the sensor data;

comparing the map-based lane progression data and the sensor-based lane progression data; and triggering an output device to output a takeover request to the user based on a result of the comparison.

2. The method according to claim 1, wherein the output device is triggered to output the takeover request based on a determination that a difference between the map-based lane progression data and the sensor-based lane progression data is above a predetermined threshold value.

3. The method according to claim 2, wherein route planning for future automated lateral guidance of the vehicle is determined based on the map-based lane progression data and the sensor-based lane progression data and a determination that the difference between the map-based lane progression data and the sensor-based lane progression data is below the predetermined threshold value.

4. The method according to claim 3, wherein the difference between the map-based lane progression data and the sensor-based lane progression data is determined continually.

5. The method according to claim 3, wherein the takeover request is output in such a way that the vehicle is prevented from leaving the lane until a probable time of takeover by the user.

6. The method according to claim 2, wherein the difference between the map-based lane progression data and the sensor-based lane progression data is determined continually.

7. The method according to claim 2, wherein the takeover request is output in such a way that the vehicle is prevented from leaving the lane until a probable time of takeover by the user.

8. The method according to claim 1, wherein the takeover request is output in such a way that the vehicle is prevented from leaving the lane until a probable time of takeover by the user.

9. A non-transitory computer-readable medium storing a program including instructions that, when executed by a computing device, cause the computing device to perform a method according to claim 1.

10. A computing device for a driver assistance system of a vehicle, wherein the computing device is designed so as, during automated lateral guidance of the vehicle to:

receive satellite-based position data that describe a position of the vehicle;

determine map-based lane progression data that describe a future desired movement of the vehicle with reference to lanes of a road based on the satellite-based position data and high-resolution map data;

receive sensor data from at least one surroundings sensor of the vehicle, the sensor data describing boundaries of the lanes; and determine sensor-based lane progression data that describe a future desired movement of the vehicle with reference to the lanes based on the sensor data;

wherein the computing device is further designed to compare the map-based lane progression data and the sensor-based lane progression data, and to trigger an output device to output a takeover request to the user based on a result of the comparison.

11. A driver assistance system for a vehicle, the driver assistance system comprising a computing device according to claim 10 and an output device for outputting a takeover request to a user of the vehicle, the driver assistance system being designed for automated lateral guidance of the vehicle.

\* \* \* \* \*